Sept. 20, 1960 — W. L. HUGHES — 2,953,633

METHOD FOR RECORDING AND REPRODUCING COLOR TELEVISION INFORMATION

Filed April 23, 1959 — 4 Sheets-Sheet 1

INVENTOR.
William L. Hughes,
BY
Dawson, Tilton, Fallon & Lungmus,
ATTORNEYS.

Sept. 20, 1960

W. L. HUGHES 2,953,633

METHOD FOR RECORDING AND REPRODUCING COLOR TELEVISION INFORMATION

Filed April 23, 1959

4 Sheets-Sheet 2

INVENTOR:
William L. Hughes,
BY
Dawson, Tilton, Fallon + Lungmus,
ATTORNEYS.

INVENTOR:
William L. Hughes,
BY
Dawson, Tilton, Fallon & Lungmus,
ATTORNEYS.

Sept. 20, 1960 W. L. HUGHES 2,953,633

METHOD FOR RECORDING AND REPRODUCING COLOR TELEVISION INFORMATION

Filed April 23, 1959 4 Sheets-Sheet 4

INVENTOR:
William L. Hughes,
BY
Dawson, Tilton, Fallon & Lungmus,
ATTORNEYS.

United States Patent Office 2,953,633

Patented Sept. 20, 1960

2,953,633

METHOD FOR RECORDING AND REPRODUCING COLOR TELEVISION INFORMATION

William L. Hughes, Ames, Iowa, assignor to Iowa State College Research Foundation, Inc., Ames, Iowa, a corporation of Iowa Filed Apr. 23, 1959, Ser. No. 808,496

6 Claims. (Cl. 178—5.2)

Figures 1, 2:
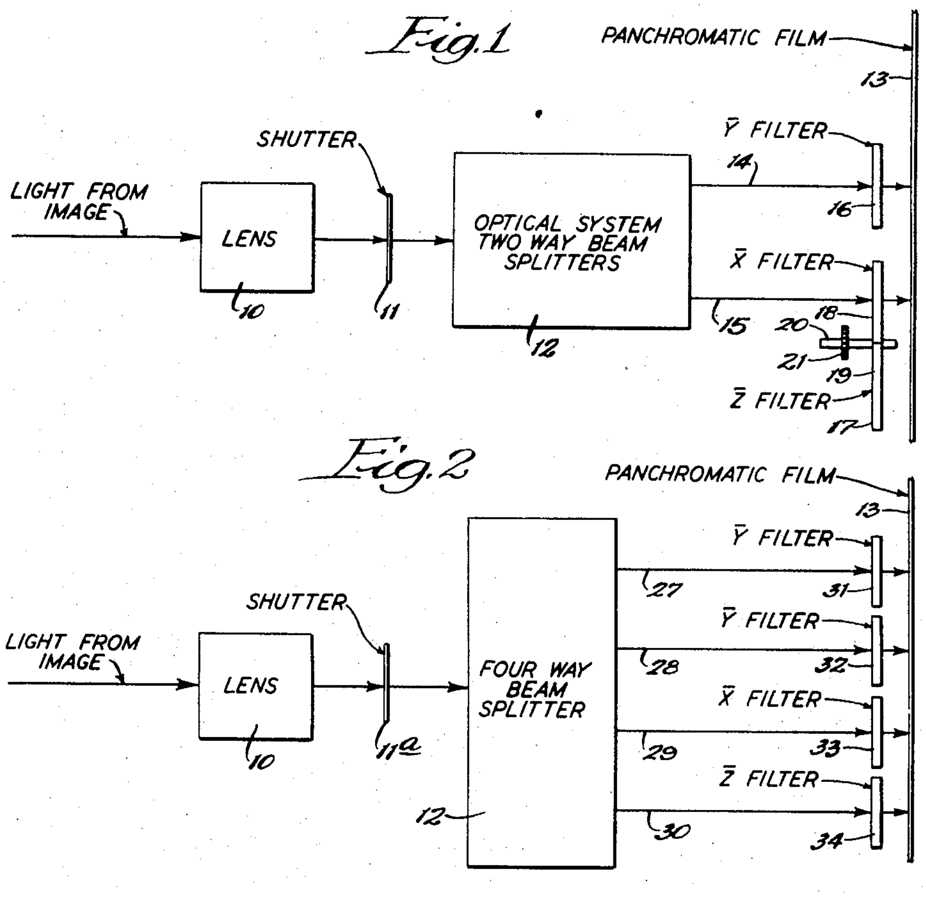

This invention relates to a method for recording and reproducing color television information and, more particularly, storing the information on and reproducing it from black and white films.

This application is a continuation in part of my now abandoned applications Serial Nos. 457,511 and 475,534 filed September 21, 1954, and December 15, 1954, respectively. This application also includes subject matter from my prior application Serial No. 456,493, filed September 16, 1954, and now abandoned.

With the increasing use and popularity of color television, it is expected that eventually a large number of programs will originate from recordings. Presently, color film and magnetic tape are being used for storing and reproducing color video pictures for color television transmission. Each of these systems has a number of disadvantages and limitations that curtail their use and restrict their application. For example, color film is expensive, colorimetric accuracy is difficult to maintain and it is extremely difficult to make kinescope recordings therewith. Further, in color film, the density ranges required to obtain saturated colors are difficult to obtain when an attempt is made to transmit the film reproductions over a standard television system which is fundamentally limited in contrast range.

Another drawback to the use of color film is that the flying spot scanner built for transmission of color film must use dichroic mirrors or some similar device to split the colors into their three basic components. Also, the spectral characteristics of the projection cathode ray tubes used to scan the film are far from desirable. In particular, they are generally deficient in the red end of the spectrum. This fact, coupled with the usual lack of red sensitivity of many photo multipliers, may lead to equipment and noise complication in the transmitted picture.

Magnetic tape is not as convenient as film for on-the-spot recording because of the large amount of electronic equipment required and that would have to be transported for such recording.

In standard television transmission, a picture (i.e., a frame) comprises five hundred and twenty-five scanning lines and consists of two fields. Each field includes two hundred sixty-two and one-half scanning lines. The lines of the two fields are offset from each other or are interlaced to form the complete frame of five hundred and twenty-five lines. The essential aspects of a television image are gross structure (the outline of the frame and the general proportions and outlines of the objects of the image), fine structure (details of the objects and sharpness of their outlines), image continuity (smooth representation of motion and freedom from flicker—the requirement for relative freedom from flicker has led to the adoption of a frame rate of thirty per second and a field rate of sixty per second), and otnal gradation (the delineation of the brightness values in proper proportions from light to dark). If the television image is in color, additional essential aspects are chromaticity values (hues and saturations) and congruence (condition of exact superimposition).

The important color aspects by which objects in a scene are distinguished, independent of their geometric form, are tonal gradation or brightness (lightness and darkness), hue (color shading, that is, the redness, blueness, greenness, etc.) and saturation (inverse measure of the dilution of the hue by white light). While the combination of these factors are countless, the eye perceives color on a relatively simple basis and, as a result, many color combinations can be represented as combinations of three suitably chosen primary colors and it is only necessary in reproducing each picture element to specify the relative intensity of the three specified colors—the primary colors.

It is an object of the present invention to provide a method and apparatus for storing or recording colorimetric information on black and white film for the reproduction from that film of color pictures. Another object of the invention is to provide a method and apparatus for laying colorimetric picture information on black and white film in an arrangement such that the color information can be used and reproduced as color pictures for transmission in color television systems.

Still another object of this invention is to provide a method and apparatus for utilizing colorimetric information recorded on black and white film for providing color video signals for transmission in color television systems. Yet another object of the invention is to provide a method and apparatus for recovering colorimetric information stored on black and white film for the transmission of that information as color video signals in a color television system while maintaining all of the essential image aspects that are requisite to a fine television picture.

A further object of this invention is to provide method and apparatus for reproducing color information from black and white film in which all of the several images that are individually read and that comprise the standard fields and frames, are read in such a manner that all of those that comprise a single television frame have been recorded simultaneously on the black and white film whereby any possibility of color fringing is avoided. Additional objects and advantages will appear as the specification proceeds. Additional objects and advantages may be seen as this specification proceeds.

Embodiments of the invention are illustrated in the accompanying drawing, in which—

Figure 3:
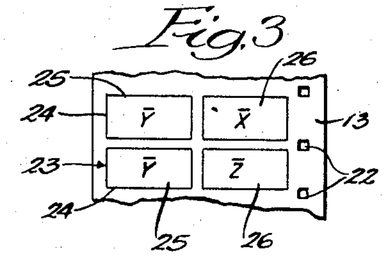
Figures 4, 5:
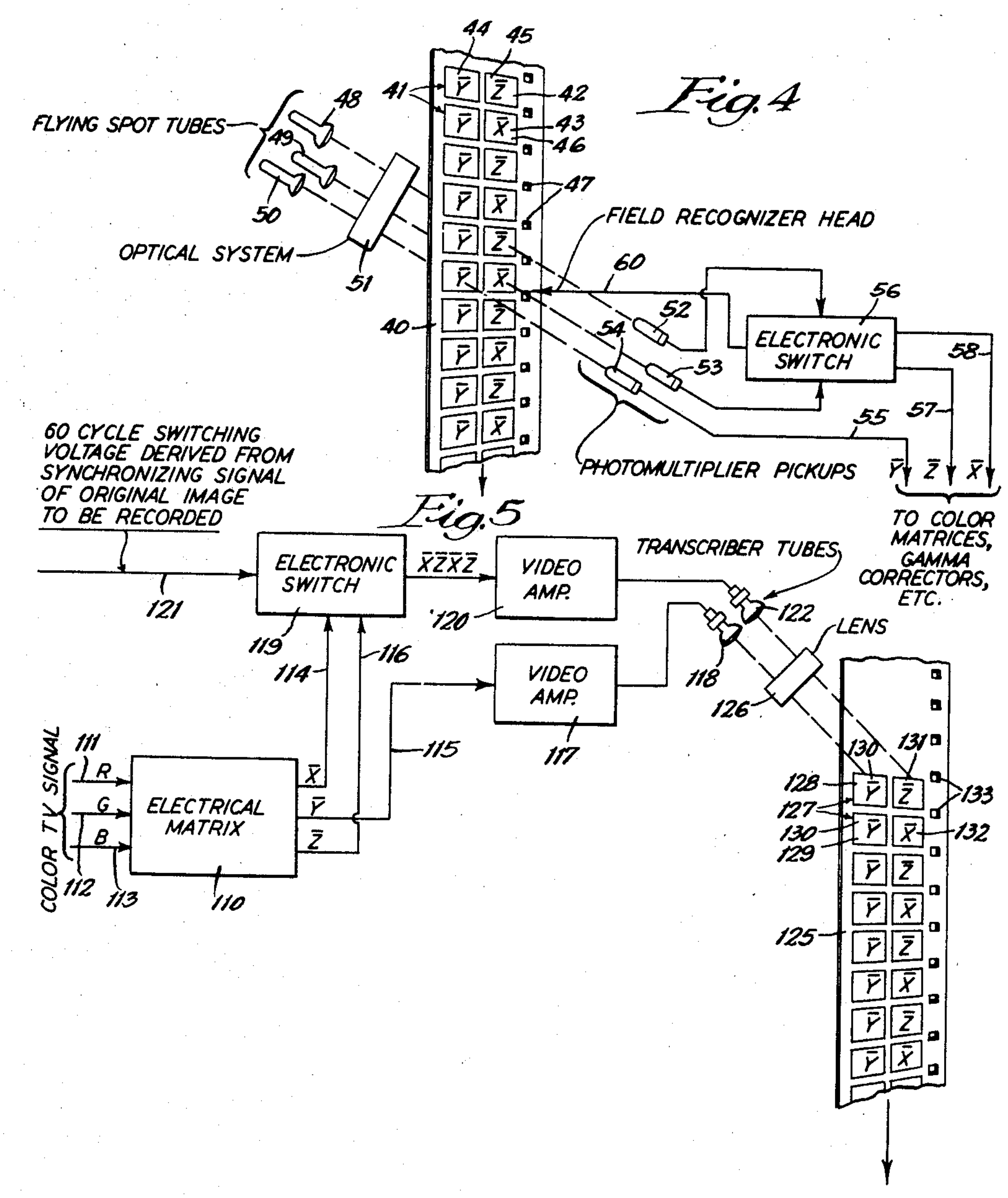
Figure 6:
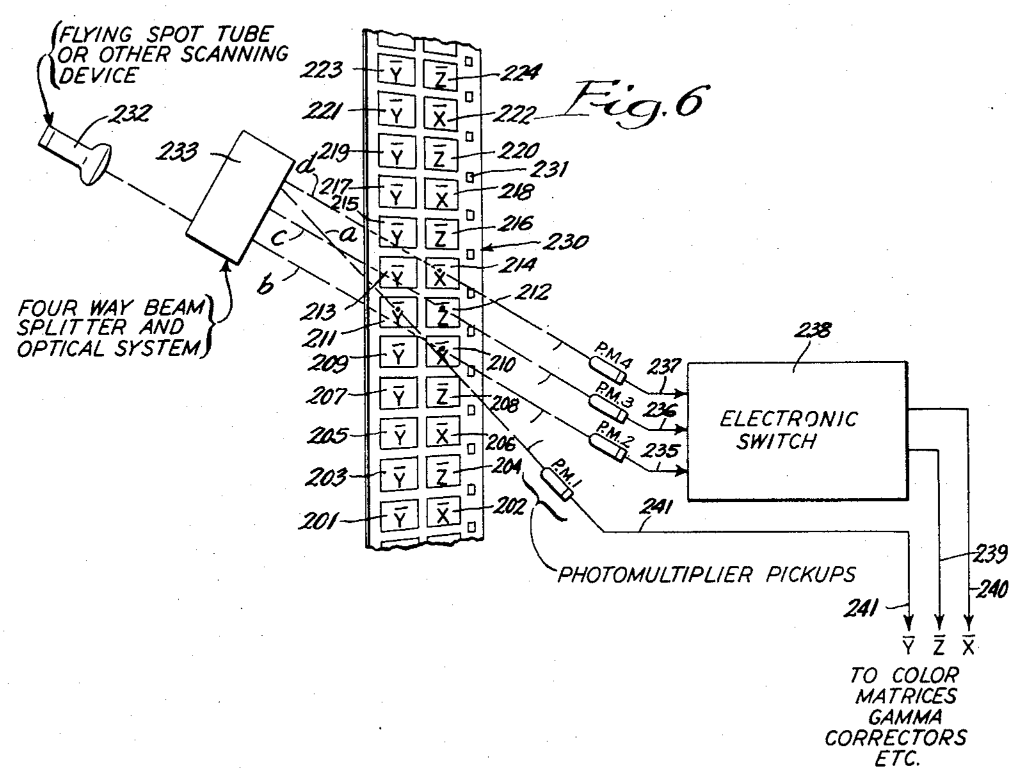
Figure 7:
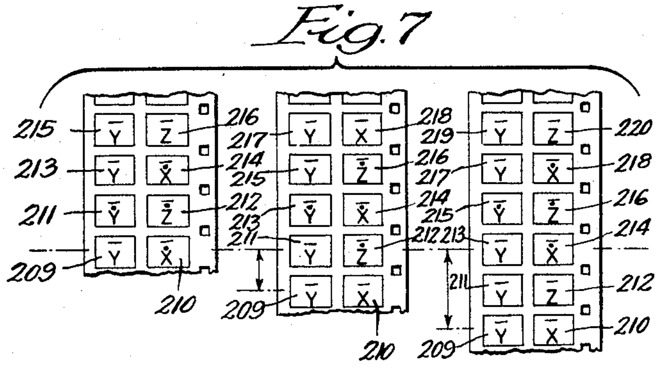
Figure 8:
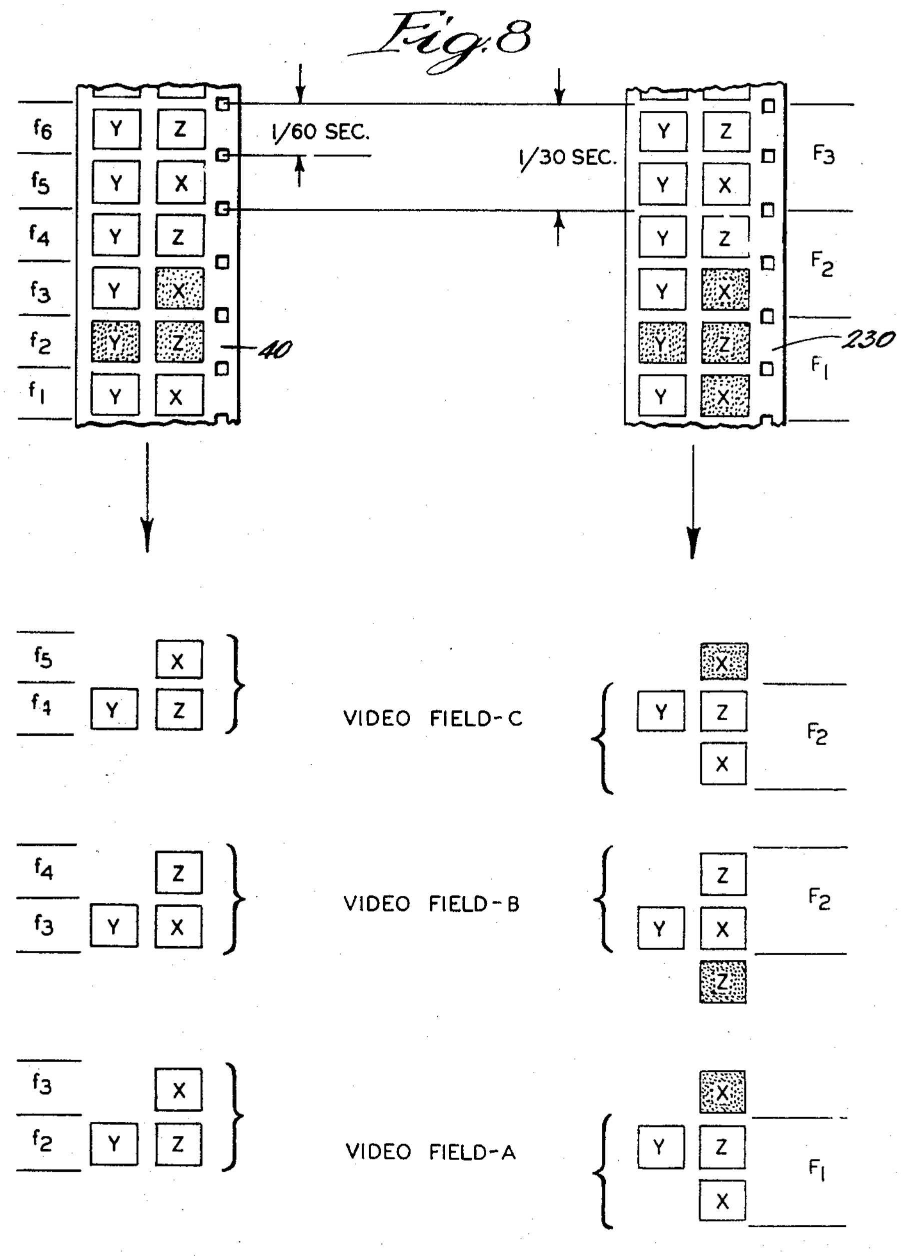

Figure 1 is a diagrammatic view showing apparatus for carrying out recordal of color television information; Fig. 2 is a diagrammatic view showing a modified form of apparatus for recordal of color television information; Fig. 3 is a broken front view in elevation of a black and white film strip having colorimetric images impressed thereon; Fig. 4 is a diagrammatic view showing a system for reproducing color video signals for transmission in a color television system from colorimetric information recorded on black and white film; Fig. 5 is a diagrammatic view showing a system for the direct recordation on black and white film of color television signals; Fig. 6 is a diagrammatic view showing another system for reproducing color video signals for transmission in a color television system from colorimetric information recorded on black and white film; Fig. 7 is a broken front view in elevation and in largely diagrammatic form showing the scanning of the colorimetric images in relation to the movement of the film strip; and Fig. 8 is a schematic comparison of the operational results of the apparatus of Figs. 4 and 6.

A specific system that may be employed for recording colorimetric information on black and white film will now be described with particular reference to the drawing. The illustration in the drawing, both with respect to Fig. 1 and Fig. 2, is largely diagrammatic. A specific camera mechanism to accomplish the named results may be readily provided by those skilled in the art in following the teachings of this application. Further, the specific mechanism employed may take varied forms and the structural details of any camera that might be described can be varied considerably. While a number of complicated recording mechanisms or cameras might be provided, I prefer to use a purely mechanical camera.

Illustrated in Fig. 1 is a camera or mechanical recording device that includes a lens 10 adapted to receive light from an image and to gather and focus that light. Since this camera device can be used to produce film for the color television film scanner of Fig. 4, this lens would either be anamorphic or would be a regular lens used in conjunction with some optical device to compress the vertical dimension. This vertical compression is useful to save film but is not absolutely necessary.

Positioned rearwardly of the lens 10 is a shutter mechanism 11 that is operative when opened to permit light that is gathered and focused by the lens 10 to be directed to a beam splitter 12. The shutter 11 will employ the usual mechanism found in motion picture cameras that results in the rapid interruption of the beam of light from the lens 10 in synchronism with the intermittent movement of the film strip 13 through the camera. In the specific structure illustrated, the shutter 11 will open and close sixty times each second so that thirty picture frames comprising two fields each will be recorded on the film 13. Thus, a total of one hundred twenty separate images are recorded each second. That specific speed is desirable, for in television reproduction, the film travels at a rate of thirty frames per second and each frame comprises two separate interlaced fields.

The beam splitter 12, illustrated in Fig. 1, is operative to split the beam of light from the original image to be recorded and that is focused through the lens 10 into two separate light images. Preferably, the two-way beam splitter comprises an optical system for such systems are reliable and have no moving parts. Certain crystalline structures are operative to provide two separate beams or light images when a single light beam or image is impinged thereon, or it is possible to provide separate light images through the use of mirrors, etc., all as is well known. For purposes of identification, the individual light images are indicated diagrammatically in the drawing and are designated with the numerals 14 and 15 respectively.

Interposed between the beam splitter 12 and the film strip 13 and in the path of the light image 14 is a filter 16. Similarly, interposed between the beam splitter 12 and film strip 13 and in the path of the light image 15 is a filter structure 17 that comprises two filter elements 18 and 19 respectively. The filter section 17 is mounted upon a shaft 20 equipped with a drive gear 21 that is adapted to mesh with and be driven by an appropriate drive mechanism (not shown). The filter elements 18 and 19 are substantially equal dimensionally and comprise respectively one-half of the filter structure 17. The structure 17 is intended to be rotated at a speed of sixty revolutions per second so that for thirty times each second the element 18 is interposed in the path of the light image 15, and similarly for thirty times each second the element 19 is interposed in the path of the light image 15.

The film strip 13 should be a panchromatic film. It will be apparent that the film 13 may be conventional motion picture film and, if desired, can be 16 millimeter, 35 millimeter, or may be of any other suitable size. The film will be secured to reels in the conventional manner and through appropriate drive mechanism will be drawn through the camera. The drive mechanism will be synchronized with the operation of the shutter 11 and the speed of operation is such that thirty picture frames, each comprising two separate fields will be provided for each second of movement of the film strip 13.

A better understanding of the picture characteristics can be obtained by referring to Fig. 3 which illustrates a portion of the film strip 13. It is there seen that the film strip is provided along one longitudinal edge thereof with a plurality of openings or apertures 22 therethrough that are utilized in receiving the teeth of a sprocket gear that draws the film strip through the camera mechanism. Illustrated in Fig. 3 is a complete picture frame that is designated with the numeral 23. The complete frame 23 comprises two separate fields 24 and as is seen, each of the fields 24 has two colorimetric light images 25 and 26 impressed thereon. That is to say, each of the frames 23 comprises three separate light images. Actually, as is apparent from Fig. 3, four individual light images are impressed upon the film. However, one of the images, namely, image 25, in each of the fields 24 is the same in each field. That light imeage is designated with the character $\bar{y}$. The second light image in one of the fields 24 is designated with the character $\bar{x}$, while the second light image in the other of the fields 24 is designated with the character $\bar{z}$. The reference characters $\bar{x}$, $\bar{y}$ and $\bar{z}$ are used for purposes of identification and might well conform to the standard C.I.E. designations. It must be emphasized, however, that many other sets of colorimetric primaries could be used in the system. For example, red, green and blue might be used.

It will be noted, in Fig. 1 that the color filter 16 is also identified with the character $\bar{y}$, while the filter 18 is an $\bar{x}$ filter, and the filter 19 is a $\bar{z}$ filter. These filters are operative to provide colorimetric light images that are representative of one of the primary colors. Preferably, the filters are primary additive filters that are operative to absorb from the white light passing therethrough all of the light but that of the primary color.

It has been brought out hereinbefore that the human eye is sensitive to brightness or luminescent detail, but is relatively insensitive to color or chrominance detail. If the standard C.I.E. primaries $\bar{x}$, $\bar{y}$ and $\bar{z}$ are used, it is possible to duplicate substantially all of the color quantities through the control of the presentation of luminescence detail when combined with the controlled presentation of chroma information. Substantially full luminescence detail is then provided for each field 24 in a frame 23, and this luminescence detail is provided by the $\bar{y}$ light image 25 that is present in each of the fields 24. Chrominance information is provided in each field by the $\bar{x}$ light image in one instance and the $\bar{z}$ light image in the other field. It should be appreciated, however, that while the concept of recording luminescence detail completely in one channel only, and chrominance detail in the other channel only is a very good technique, it is not absolutely essential and variations may be made in the specific arrangement herein disclosed.

In operation of the apparatus shown in Fig. 1, the camera and specifically the lens 10 thereof is directed toward the image that it is desired to photograph. Light from that image impinges upon the lens 10 and is directed by the lens and upon opening of the shutter 11 to the optical beam splitter 12. The beam splitter functions to provide two separate light images. One of the images passes through a $\bar{y}$ filter and is imposed upon the film strip 13 that is exposed thereto. The other light image passes through the $\bar{x}$ filter 18 and is impressed upon the film strip 13. Upon the next positioning of the film strip 13 and when the shutter 11 is again opened, the light image 14 passing through the stationary $\bar{y}$ filter imposes a second light image upon the film strip 13, while the light image 15 then passes through the filter 19 that has been rotated through 180° and replaces the $\bar{x}$ filter 18, and a $\bar{z}$ image is then impressed on the film strip 13. Thus, a complete film frame comprising two separate film fields has been impressed upon the film strip 13 and this procedure is repeated. Preferably, the colorimetric light images are impressed upon the film strip 13 in the side by side relationship shown in Fig. 3. However, this specific orientation of the light images upon the film strip is not essential and other arrangements may well be employed.

In the modified form of apparatus shown in Fig. 2, the elements employed may be substantially the same as those shown in Fig. 1 and that have been described. Thus, each of the identical elements is designated with the same numeral. The lens 10 in Fig. 2 may be the same as the lens 10 in Fig. 1, as may be the film strip 13. The shutter structure designated 11 in Fig. 3, may be substantially the same except that it will have an operating speed of thirty per second. With the structure shown, a complete picture frame comprising two fields is recorded or impressed upon the film strip 13 at each opening of the shutter. The beam splitter **12*a* is operative to form four separate light images that are designated 27, 28, 29 and 30 from the single light image directed thereto through the lens 10. The beam splitter 12*a*** may be an optical system just as that described with reference to Fig. 1. In either Fig. 1 or 2, the optical beam splitters might also perform all or part of the required color separation if dichroic mirrors or other color sensitive optical devices are used.

The filters 31, 32, 33 and 34 are substantially identical with those shown in Fig. 1. The filters 31 and 32 are $\bar{y}$ filters, while the filter 33 is an $\bar{x}$ filter and the filter 34 is a $\bar{z}$ filter. Each of the filters is stationary for they are so oriented relative to the light images emanating from the beam splitter **12*a* that each has one of the light images passing therethrough. The filters 31 through 34 are also oriented with respect to the film strip 13 so that two complete fields 25 and 26 comprising a frame 23 are impressed upon the film strip 13 at one opening of the shutters 11*a***.

Ordinarily it will be desirable to provide index marks or field recognizer marks along the film strip 13 that will have for their function the differentiation of the film fields 24 that comprise a film frame 23. Such field recognizer marks may be provided initially upon the film strip 13, but in such event, it will be necessary to use precaution in threading the film strip through the camera apparatus to insure proper alignment of the field recognizer marks with the fields 24. On the other hand, means may be provided in the camera to impress field recognizer marks of some character upon the film strip 13 during the exposure thereof. Experimentally it is found, however, that field recognizer marks are not necessary for successful operation because there is one television field per sprocket hole on the film, and once the film is started properly, it never gets out of step. The field recognizer marks are useful in automatically starting the film properly, however.

For purposes of further elaboration, some mention may be made of the exposure of the film strip 13 which is the negative, and from which a positive film strip may be made. Preferably, the negative film strip 13 is exposed such that $$\bar{y}(\lambda) \cong f_y(\lambda)F(\lambda) \tag{1}$$

In (1) $y$ ($\lambda$) equals the luminosity curve for the standard observer, F($\lambda$) equals the spectral sensitivity of the negative film emulsion when interpreted in terms of the transmission of a resultant positive, and $f_y(\lambda)$ equals the spectral transmission of a color filter that is used to expose the $\bar{y}$ portion of the film. When the above equation holds, the brightness channel of the color television system is obtained directly from the $\bar{y}$ image, and then it is necessary to scan that image for each field in the reproduction of color pictures from the recorded colorimetric information.

The exposure formulas for the $x$ and $z$ images are preferably as follows:

$$\bar{x}(\lambda) \cong f_x(\lambda)F(\lambda) \tag{2}$$

$$\bar{z}(\lambda) \cong f_z(\lambda)F(\lambda) \tag{3}$$

In (2) and (3) $\bar{x}(\lambda)$ and $\bar{z}(\lambda)$ are the standard C.I.E. curves respectively for $\bar{x}$ and $\bar{z}$, F($\lambda$) is the film spectral sensitivity, and $f_x(\lambda)$ and $f_y(\lambda)$ are the spectral transmission of the color filters used to expose respectively the $\bar{x}$ and $\bar{y}$ portions of the film.

In storing colorimetric information on black and white film, the problem connected with the $\bar{y}$, $\bar{x}$ and $\bar{z}$ channels are essentially identical. In the following consideration of these problems, the discussion will be directed to only the $\bar{y}$ channel.

One of the primary considerations is the problem of interpreting the meaning of "spectral sensitivity" when that term is applied to a television camera and to black and white film. The spectral sensitivity of a television camera tube is usually defined as the current output of that tube for various monochromatic lights of equal energy. It is usually given as a curve (with ordinates normalized to the highest value) of current versus light wave length in millimicrons. Spectral sensitivity of a camera tube is frequently measured by holding the current constant and by varying the amplitude of the various monochromatic lights. This is done to avoid the simultaneous measurement of any nonlinear transfer characteristic that may be inherent in the tube.

The spectral sensitivity of black and white film is usually thought of in terms of the density that is produced on that film by various monochromatic lights of given energies. Spectral sensitivity information for black and white film may be illustrated as a family of H–D curves that are plotted with the density (−log transmission) as the ordinate and log exposure as the abscissa for various values of exposure to a monochromatic light. Each curve then defines the film characteristics for a given wave length monochromatic light.

The gamma of a film is defined as:

$$\frac{D_2-D_1}{\log E_2-\log E_1} \tag{4}$$

In (4), $D_2$ is the density of a given point on the negative film, $D_1$ is the density of any other point that received an exposure of the same light wave length but of different energy than the point $D_2$. $E_2$ is the exposure energy for point 2 in ergs./cm². $E_1$ is the exposure energy for point 1. The gamma for a given wave length is simply the slope of the H–D curve for that wave length. The densities that would be produced on the negative film, if it were exposed to different wave lengths of monochromatic light which had the same energy, can be determined by drawing intercepts on the H–D curves at the different wave lengths. The exposure time would be the same in each case because exposure is considered to be light energy rate times time. A film so exposed can be developed and a positive film made therefrom that will be developed to a predetermined gamma. The densities that would result on the positive film may be shown as curves that are plotted against positive density versus wave length of the light used to expose the negative for given values of negative exposure. These positive densities, then, are a function of:

(1) The wavelength of light used to expose the negative.

(2) The development process of the negative.

(3) The exposure and development of the positive,

In terms of what is seen by a television camera tube, film spectral sensitivity is the resultant transmission of a positive print for given exposure energies and wave lengths of the light that exposed the negative film. The spectral sensitivity can be modified by exposing the original negative film through a color filter. Such a color filter might very likely be one of the Wratten gelatin series made by the Eastman Kodak Company. However, correction and modification of the spectral sensitivity may be accomplished quite simply in the color television system itself by means of electrical matrixing.

The system for recording colorimetric information on black and white film is advantageous for a number of reasons. First, it enables cameras or recording devices to be employed that are entirely mechanical. Such cameras can be highly mobile and are adapted for use in the field for on-the-spot picture recording. The film used in the mechanical cameras may be ordinary panchromatic black and white film of any desired size. Any errors that may occur in negative exposure or development can be minimized by insertion of gamma correctors in each channel of the film reproducing mechanism and/or by proper matrixing of the three signals in electrical form. It will be appreciated that the processing of black and white film is much simpler and less expensive than it is for color film. Ordinarily, it is not out of the question for a small or medium size television station to have a small black and white film processor. However, the possibility of having a color processor, the technicians that are qualified to run it, or convenient facilities for processing color film are much more remote.

The invention is also applicable to kinescope recording of colorimetric information on black and white film. This is illustrated in Fig. 5 of the drawing.

Referring then to Fig. 5, it is seen that an electrical matrix 110 is provided, and into the matrix are fed a plurality of colorimetric signals, one for each of the primary colors—red, green and blue, and these signals for purposes of identification are designated with the numerals 111, 112, and 113. The matrix 10 produces three separate signals 114, 115 and 116 that comprise the colorimetric signal information represented by the signals 111, 112 and 113. That is, as is well known in the art, the matrix by electronic algebraic addition provides the recording primary signals for energizing the transcriber tubes. For a treatment of such matrices, reference may be made to Matrix Networks for Color TV by William R. Feingold, Proceedings of the I.R.E. Second Color TV issue January 1954, pages 201–203.

To further elaborate this matter, it should be made clear that the symbols $\bar{x}$, $\bar{y}$ and $\bar{z}$ are not to be used to designate primary colors, but rather to identify symbolically primary images or primary signals. Thus, where $\bar{x}$, $\bar{y}$ and $\bar{z}$ are used, it means simply that the transmission $Te(y)$ of a given picture element on the $\bar{y}$ image will be determined by the formula:

$$Te(y) \sim \left[\int_{400\text{ mu}}^{700\text{ mu}} I(\lambda)\bar{y}(\lambda)\,d\lambda\right]^{\gamma}$$

The transmission $Te(x)$ of the same picture element on the $\bar{x}$ image will be determined by the formula:

$$Te(x) \sim \left[\int_{400\text{ mu}}^{700\text{ mu}} I(\lambda)\bar{x}(\lambda)\,d\lambda\right]^{\gamma}$$

The transmission $Te(z)$ of that same picture element on the $\bar{z}$ image will be determined by the formula:

$$Te(z) \sim \left[\int_{400\text{ mu}}^{700\text{ mu}} I(\lambda)\bar{z}(\lambda)\,d\lambda\right]^{\gamma}$$

In these formulae:

(1) $I(\lambda)$ is the spectral distribution of that picture element of the original scene, (2) $\bar{x}(\lambda)$, $\bar{y}(\lambda)$ and $\bar{z}(\lambda)$ represent the desired taking sensitivities of the recording medium, and (3) $\gamma$ represents the over-all gamma of the film process.

The transmission $Te(y)$ does in fact represent the luminance signal or the brightness signal as in the N.T.S.C. specification. However, it cannot be said that this signal is not indicative of color information since such information is not determined uniquely without all three transmissions, $Te(y)$, $Te(x)$ and $Te(z)$. Thus, it may be said correctly that the $\bar{y}$ signal is a luminance signal and is a primary piece of colorimetric information.

The $\bar{y}$ signal 115 is fed directly to a video amplifier 117 that may be completely conventional, and from the amplifier 117 to a transcriber device (probably a cathode ray tube) 118. The $\bar{x}$ and $\bar{z}$ signals 114 and 116 are fed to an electronic switch 119 that is operative to first pass the $\bar{x}$ signal therethrough while blocking the $\bar{z}$ and to a conventional video amplifier 120, and then to pass the $\bar{z}$ signal therethrough to the video amplifier 120 while blocking the $\bar{x}$ signal. The bandpass and D.-C. level requirements are quite stringent. The switch 119 is synchronized so that it alternately passes the $\bar{x}$ and $\bar{z}$ signals to the video amplifier 120 at some predetermined rate, and that rate may be determined from the synchronizing signal of the image to be recorded. Such synchronizing signal is fed into the switch 119 as is designated by the numeral 121. The signals emanating from the video amplifier 120 are fed to a transcriber device 122. The transcriber devices 118 and 122 may be conventional tubes and, preferably, have a relatively short decay time. For example, 5ZP16 tubes might be employed. Although three separate recording primaries ($\bar{x}$, $\bar{y}$ and $\bar{z}$), are provided by the electrical matrix 110, only two separate transcriber tubes are required since the tube 122 performs dual work and handles alternately the $\bar{x}$ and $\bar{z}$ recording primaries or signals.

The horizontal sweep for the transcriber devices 118 and 122 is controlled by a sweep unit that is conventional, and that is synchronized by the incoming synchronizing signal 121.

The colorimetric image information produced by the tubes 118 and 122 in response to the colorimetric signals fed thereto are focused onto a film 125 through an optical system 126. For example the optical system might consist of a combination of front surface mirrors and two conventional 50 mm. lenses. The film 125 is a black and white film which is not necessarily panchromatic. Means will be provided, which are not shown, to move the film strip 125 continuously. Because of the continuous movement of the film strip, only a horizontal sweep for the transcriber tubes is required.

In operation of the kinescope recorder (the term kinescope recorder is used herein in its conventional sense to mean a device which records on film the image appearing on the face of a transcriber tube-kinescope; a kinescope should not be confused with an iconoscope which is a storage camera tube now almost obsolete but still used to a limited extent for conventional television film broadcasting), the colorimetric signals 111, 112 and 113 that are present at the kinescope are fed directly to the electric matrix, and the $\bar{y}$ signal provided at the output of the matrix is fed directly to the transcriber tube 118 through the video amplifier. The $\bar{x}$ and $\bar{z}$ signals are fed to the electronic switch 119, and then sequentially the $\bar{x}$ and $\bar{z}$ signals are fed alternately to the transcriber tube 122 after being amplified in the video amplifier 120. The $\bar{y}$ signal carries substantially all the brightness or luminance information, while $\bar{x}$ and $\bar{z}$ signals carry the chrominance information. It should be recognized, however, that it is not absolutely essential to completely separate chrominance and luminance information. This is simply a matter of choice when the primaries to be recorded are selected.

As has been stated hereinbefore, each complete picture frame in a color television picture comprises two distinct fields—one offset from the other—and that are oriented in an interlaced relation. In the specific arrangement shown, the colorimetric information is laid or imposed upon the film 125 so that one picture frame, that is designated with the numeral 125, comprises two fields 128 and 129. The field 128 constitutes a $\bar{y}$ image 130 and $\bar{z}$ image 131, while the field 129 comprises a $\bar{y}$ image 130 and an $\bar{x}$ image 132. Thus, in reproducing color video pictures from the information stored on the film 125, luminance detail carried by the $\bar{y}$ image is present in each of the fields 128 and 129.

It is required in the reproduction of colorimetric signals from the image information stored upon the film 125 that indicia be provided that will designate the separate fields 128 and 129. The particular indicia employed is unimportant and, for example, might be field recognizer marks formed in the film in the manufacture thereof or it might be field recognizer marks formed on the film while the colorimetric image information is impressed thereon. The apertures 133 are employed for receiving the teeth of a sprocket drive for moving the film through the recording apparatus. In commercial models, field recognizing information (perhaps for corrective purposes) may be provided by one of the previously mentioned methods.

Referring now to Figure 4, it will be apparent that the system illustrated there comprises means for reproducing colorimetric video signals from the colorimetric information stored on black and white film. The film strip having the colorimetric information impressed thereon is designated with the numeral 40, and in the specific illustration given each film frame 41 comprises two film fields 42 and 43, each having a $\bar{y}$ image 44 as a part thereof. The field 42 also contains the $\bar{z}$ image 45, and the field 43 includes, along with the $\bar{y}$ image, an $\bar{x}$ image 46. The apertures 47 function in a conventional manner to draw the film through an apparatus by receiving the teeth of a sprocket drive wheel, and may also serve as field recognizer marks to differentiate a field 42 from a field 43.

Means are provided in the apparatus for moving the film 40 continuously therethrough. Such drive apparatus has not been illustrated because it is completely conventional. The speed of movement will be 30 film frames per second or, stated another way, at the rate of 60 film frames per second. It will be apparent that the same recordation rate will be employed in exposing the films 13 or 125.

The image information 44, 45 and 46 is scanned preferably by flying spot tubes. A single tube may be employed in combination with a beam splitter to provide three separate scanning beams or, as is shown in the drawing, three separate scanning tubes 48, 49 and 50 can be employed. The scanner tubes are preferably flying spot tubes and may be, for example 5WP15's or 5ZP16's or equivalent tubes. The tubes are oriented in combination with an optical system 51 so that each of the tubes scans simultaneously one of the colorimetric images $\bar{x}$, $\bar{y}$ and $\bar{z}$. An alternative is obviously to employ a beam splitter and a single scanner tube. In the illustration, the scanning tube 48 scans in the initial position shown a $\bar{z}$ image, the tube 49 scans an $\bar{x}$ image, while the tube 50 scans a $\bar{y}$ image. It will be apparent that as the film 40 moves continuously, the tube 50 will always scan the $\bar{y}$ image while the tubes 48 and 49 will alternately scan the $\bar{z}$ and $\bar{x}$ images in reverse order. Horizontal sweep control is provided for the scanner tubes and any suitable sweep arrangement may be employed. The optical system 51, for example, may be a combination of front surface mirrors and 50 or 75 mm. lenses.

The scanner tubes 48, 49 and 50 are employed in combination with photo multiplier pick-up tubes 52, 53 and 54. The latter three tubes comprise a pick-up head. The flying spots provided by the scanner tubes 48, 49 and 50 provide a reproduction of the colorimetric image information stored upon the film 40 respectively on each of the pick-up tubes 52, 53 and 54.

The pick-up tube 54 always receives a $\bar{y}$ image and develops therefrom colorimetric $\bar{y}$ signal that is designated in the drawing with the numeral 55. The $\bar{x}$ and $\bar{z}$ signals produced by the pick-up tubes 52 and 53 are fed into an electronic switch 56 that is operative to pass the $\bar{x}$ and $\bar{z}$ signals alternately. The electronic switch 56 is controlled in synchronism with the movement of the film 40 so that the condition of the switch is changed for each complete replacement of one picture field with another as the film advances.

That is to say, the switch 56 functions so as to feed only $\bar{z}$ signals to the line 57 and only $\bar{x}$ signals to the line 58. For example, if the film strip 40 in the position shown is presenting the first field of a frame to the flying spot tubes and the pick-up tubes, an $\bar{x}$ signal is fed to the switch through the tube 53 and a $\bar{z}$ signal is fed to the switch through the tube 52. The switch is now conditioned to pass the $\bar{x}$ signal from the tube 53 to the line 58 and the $\bar{z}$ signal from the tube 52 to the line 57. Now, when the film strip moves downwardly one frame, the tube 53 is receiving the $\bar{z}$ signal previously received by the tube 52, and the tube 52 is receiving the $\bar{x}$ signal in the first field of the next frame. The switch condition has changed, however, so that the $\bar{z}$ signal is fed from the tube 53 to the line 57, and the $\bar{x}$ signal of the next field (and frame) is fed from the tube 52 to the line 58. It is seen then that the switch functions as a cross-over device.

In the kinescope recorder wherein two flying spot scanners are used, one is always used for the luminance information ($\bar{y}$); the other records $\bar{x}$ information for one field during which time $\bar{z}$ information is discarded. In the next field, $\bar{z}$ information is recorded and $\bar{x}$ information is discarded. In the reproducing mechanism, however, three signals must be read simultaneously if a color picture is to be produced. Therefore, in each field one of the pieces of colorimetric information, specifically either $\bar{x}$ or $\bar{z}$, is lagging the other two pieces of information by one-sixtieth of a second if a kinescope recorded film is being used. Thus, each $\bar{x}$ and $\bar{z}$ image is used twice to make up for the $\bar{x}$ and $\bar{z}$ information discarded, but each $\bar{y}$ image is used only once. While it may seem odd, it has been shown that this process results only in an extremely slight degradation of color detail and is substantially invisible to the human eye.

The field recognizer head is a device which may be used, for example, to count sprocket holes and change the electronic switch accordingly. So far, it has proved practicable to control switching from a synchronizing generator and not use a field recognizer head. Further, if a mark were placed on the film—by way of example, at every $\bar{x}$ image—the field recognizer head could operate in response to such marks to feed a pulse to the electronic switch to make certain the switching direction is correct and, if not, to correct it. However, neither of these techniques have been found necessary, but they might be useful as safety measures on a commercial model. In the illustration, a synchronizing system indicated as a field recognizer head, and designated with the numeral 60, is operatively arranged with the apertures 47 for controlling the switch 56.

In operation of the reproducing mechanism, the flying spot tubes with a synchronized horizontal sweep produce a colorimetric image at each of the photo multiplier tubes that convert such images into colorimetric signals. As heretofore explained, the $\bar{y}$ signal carries most of the luminance detail and is present in each field of a picture frame. The $\bar{x}$ and $\bar{z}$ signals appear in alternate fields of a picture frame.

The descriptions of each of the systems have been cast in the most part in terms of structural elements. It will be apparent, however, that methods are inherent in the disclosures. In the system for reproducing colorimetric information stored on black and white film as colorimetric signals for video transmission, the method in general terms includes forming a colorimetric signal for each of the images recorded on the black and white film, and arranging these signals preferably by an electronic switching means such as an electronic switch 119 as disclosed. The two signal fields together will provide, when transmitted and picked up on color television receivers, a complete color picture frame. In the kinescope recording, the method there includes forming a colorimetric image for each of the colorimetric signals originating from a transcribing device. The images are arranged and a black and white film is exposed to those images such that sequential fields are impressed upon the film, each field having a $\bar{y}$ image and one of the other colorimetric images.

The system disclosed for direct kinescope recordation is advantageous for it permits with facility the direct recording of colorimetric signals provided by a color television system. In general, the use of black and white film as a medium for recording colorimetric information for reproducing color video signals therefrom is advantageous because it is much cheaper than the use of color film, it permits the use of cameras or recording devices that are entirely mechanical, and it makes available color television from storage medium to small and medium sized television stations that are not equipped to use the more expensive and delicate color film.

In the embodiment illustrated in Figs. 6 and 7, all of the images that comprise a single picture frame are recorded simultaneously on the black and white film as is provided by the arrangement in Fig. 2.

Illustrated in Figure 6 is a film strip that is designated generally with the numeral 230. The film strip 230 is substantially a standard motion picture film and may be equipped along at least one edge thereof with apertures 231 therethrough that are adapted to receive the teeth of a sprocket drive wheel therein for drawing the film strip through the reproducing apparatus. The film strip 230 has a plurality of colorimetric images impressed or recorded thereon, and it is seen that the images are arranged in pairs and form two longitudinally extending rows. One of the rows has images that are designated with the indicia $\bar{y}$. The other row contains images that are designated alternately with the indicia $\bar{x}$, $\bar{z}$, $\bar{x}$, $\bar{z}$ and so forth. The colorimetric images recorded on the film strip 230 are also designated with the numerals 201, 202, 203, 204, etc. through 224. A single film frame comprises four separate images and, for example, the images 201, 202, 203 and 204 comprise a single frame, the images 204, 206, 207 and 208 comprise a separate frame, and so forth through the images 221, 222, 223 and 224, which also comprise a single frame. While four separate images are provided for each frame, two of the images are identical and those images are the $\bar{y}$ colorimetric images. That is to say, the $\bar{y}$ images 201 and 203 are identical, 205 and 207 are identical, etc.

The colorimetric images that are designated $\bar{x}$, $\bar{y}$ and $\bar{z}$ represent the suitably chosen primary colors that may be used in the recording and reproducing technique. The $\bar{y}$ images may provide substantially all of the luminance detail or information, while the $\bar{x}$ and $\bar{z}$ images provide substantially all of the chrominance detail or information. The nomenclature $\bar{x}$, $\bar{y}$ and $\bar{z}$ is used for it corresponds to the standard C.I.E. nomenclature and represents three types of signals that might well be used.

The colorimetric image information recorded on the film strip 230 is scanned preferably by flying spot tubes or a single tube 232, as is indicated in Figure 6. If a plurality of scanning tubes or devices are employed, one should be provided for each of the colorimetric images that it is desired to scan simultaneously. In the specific illustration, four such flying spot tubes would be provided. However, if a single tube is employed, a beam splitter and optical system 233 are provided. The beam splitter is operative to provide four separate beams from the single scanning beam emanating from the tube 32. These four separate scanning beams will then be focused through an appropriate optical system (not shown) upon the images that will be scanned simultaneously. For purposes of identification the four separate scanning beams are designated with the letters *a*, *b*, *c* and *d*. The scanning device 232 may be a flying spot tube, such as a 5WP15 or 5ZT16 or some other equivalent tube or other scanning device. It will be apparent that a horizontal sweep control should be provided for the scanning tube 232 and any suitable sweep arrangement may be employed, and since well known in the art are not described and are not shown. The optical system employed with the four-way beam splitter may be a combination of front surface mirrors, and fifty or seventy-five millimeter lenses; however, the system can be varied considerably and it is not intended that it be restricted to such components.

A pickup head is provided for use with the scanning device 232 and the beam splitter and optical system 233 arranged therewith. Preferably, a plurality of photo-multiplier pickup tubes are employed, one for each of the four beams provided by the beam splitter and optical system, and for purposes of identification, the pickup tubes are designated with the identification symbols PM–1, PM–2, PM–3 and PM–4. It is apparent from Figure 6 that the photo-multiplier tubes are oriented for receiving the respective beams provided by the beam splitter and specifically the tube PM–1 receives beam *a*, PM–2 receives beam *b*, PM–3 receives beam *c*, and PM–4 receives beam *d*.

The respective scanning beams are stationary in the embodiment illustrated in Figure 6 relative to the film strip 220 which moves with respect to these beams. It is apparent that the beam *a*, which is picked up by tube PM–1 always scans a $\bar{y}$ image while the scanning beams *b*, *c* and *d* alternately scan $\bar{x}$ and $\bar{z}$ images. The photo-multiplier pickup tubes are operative to form or provide colorimetric signals from the reproductions of the colorimetric images formed thereon by the scanning beams. The colorimetric signals provided by the photo-multiplier tubes PM–2, PM–3 and PM–4 are directed through the lines 235, 236 and 237 to an electronic switch that is designated generally with the numeral 238. $\bar{z}$ signals are always delivered from the switch 238 onto the line 239, while the $\bar{x}$ signals are delivered from the switch 238 and onto the line 240. $\bar{y}$ colorimetric signals are fed directly from the photo-multiplier tube PM–1 onto the line 241. The lines 239, 240 and 241, which carry respectively the $\bar{z}$, $\bar{x}$ and $\bar{y}$ colorimetric signals are then arranged with color matrices, gamma correctors, etc., all of which handle the signals in the usual manner, as is well known in the color video art. That is to say, the signals appearing on the lines 239, 240 and 241 are regular video colorimetric signals and may be handled thereafter in conventional apparatus, all of which is well known.

The electronic switch 238 is controlled in synchronism with the movement of the film strip 230 so that the condition of the switch is changed for each complete replacement of one film field with another as the film 230 advances. Any suitable means for synchronizing the switch with the movement of the film strip may be employed, such as field markers, etc. The electronic switch functions in a well known manner to always provide $\bar{z}$ and $\bar{x}$ signals on the lines 239 and 240, and to alternately block the signals being fed thereto through the lines 235 and 237.

It is believed that the operation and function of the system of Fig. 6 can be seen best by referring to Fig. 7 in particular. Assuming that the film strip 230 is in the position shown by the strip on the left in Figure 7, it is seen that the scanning beam *a* is scanning the $\bar{y}$ colorimetric image 211. At the same time the scanning beam *b* is scanning the $\bar{x}$ image 210, the beam *c* is scanning the $\bar{z}$ image 212, and the beam *d* is scanning the $\bar{x}$ image 214. It should be repeated here that the images 211, 212, 213 and 214 comprise a single film frame and have been recorded simultaneously on the film strip 230. Also, the two $\bar{y}$ images 211 and 213, while separately recorded, are essentially identical images. They might differ slightly if the film is a kinescope recording. When the film strip 230 has been advanced to the position shown by the center film strip in Figure 7, the beam *a* is scanning $\bar{y}$ image 213, beam *b* is scanning $\bar{z}$ image 212, beam *c* is scanning $\bar{x}$ image 214, and beam *d* is scanning $\bar{z}$ image 216. Again, when the strip has moved to the position shown at the right of Figure 7, the beams *a*, *b*, *c* and *d* are scanning respectively $\bar{y}$ image 215, $\bar{x}$ image 214, $\bar{z}$ image 216, and $\bar{x}$ image 218. Thus it is apparent that during a change of position in the film strip 230 as it is being advanced from the position shown at the left in Figure 7 to the position shown in the center of Figure 7, all of the separate colorimetric images that make up a single frame are scanned by the scanning beams in each of these positions of the film strip. If the picture frame that is formed by the images 211, 212, 213 and 214 is considered, it is apparent that the images 211, 212 and 214 are being scanned when the strip is in the position shown in the center in Figure 7. As has been brought out hereinbefore, the images 211 and 213, which are $\bar{y}$ images, are identical so that the same colorimetric images, in effect, are being scanned at each position of the film. The distance that the film is advanced between the positions shown at the left and center in Figure 7 is equal to one film field so that the scanned images 211, 212 and 214 make up one field of the picture frame, and the images 213, 214 and 212 make up the second field of the picture frame. Since all of the images 211, 212, 213 and 214 were recorded simultaneously, it is apparent that there will be no color fringing in the reproduction for only simultaneously recorded images comprise the two fields of each picture frame.

It will be noted in Figure 7 that when the images 211, 212 and 214 are being scanned to provide one field of a television picture frame, simultaneously therewith the $\bar{x}$ image 10 which forms a part of a prior television frame is also being scanned by the beam *b*. The resulting colorimetric signal is fed into the switch 238 through the line 235 and the switch 238 functions to block that signal and to permit only the signals on the lines 236 and 237 to pass therethrough. When the film strip has advanced one field and into the position shown by the center film strip in Figure 7, it is seen that the image 216 is being scanned through the beam *b* and is being fed into the switch 238 through the line 237. At this time the switch 238 operates to block the signal on the line 237 and to permit only those signals on the lines 235 and 236 to pass therethrough. The signal formed from the image 216 is unwanted for it comprises one of the images in a different picture frame from the one instantly being reproduced. The switch 238 then functions to alternately block or discard the signals being fed thereto on the lines 235 and 237. At the same time the switch functions so as to connect the appropriate lines, either 235, 236, 237 (in effect) with the lines 239 and 240 so that $\bar{z}$ signals are always present on the line 239 and $\bar{x}$ signals always present on the line 240.

In operation, a film strip is recorded by a special camera having lenses and an optical system such that four colorimetric information images are recorded simultaneously for each revolution of the shutter. Thus, in the specific illustrations of Figures 6 and 7, images 203, 204, 205 and 206 are recorded simultaneously; images 207, 208, 209 and 210 are recorded simultaneously. Similarly, images 211, 212, 213 and 214, images 215, 216, 217 and 218, etc. are recorded, respectively, simultaneously.

It will be apparent, however, that the images being scanned are 211, 212 and 214, all of which were recorded simultaneously, and image 210 which is in a wholly different field and frame and was not recorded simultaneously with images 211 through 214. The apparatus in this arrangement is conditioned to read the first field of the frame comprising the fields 211—212 and 213—214, the images of which were all recorded simultaneously. For field #1 then, P.M. 1 reads image 211, P.M. 2 reads image 210, P.M. 3 reads image 212, and P.M. 4 reads image 214. The function of the electronic switch, as has been brought out before, is to connect photo multiplier pick-ups 2 and/or 3 and/or 4 to the proper outputs such that the information used or appearing at the leads 239, 240 and 241 was recorded simultaneously. Thus, for the first field set forth above, the switch is operative to connect photo multipliers 3 and 4 to the leads 239 and 240, respectively, whereby the three signals on the leads 239, 240 and 241 are those that have been reproduced from colorimetric information images that have been recorded on the film strip simultaneously. Thus, no fringing can occur in the reproduction of this field.

For field #2 in the frame, the film strip moves downwardly the width of one field, as shown by the difference between the film strips at the left and center of Figure 7. Thus, P.M. 1 reads image 213, P.M. 2 reads image 212, P.M. 3 reads image 214, and P.M. 4 reads image 216. Images 212, 213 and 214 were all recorded simultaneously and comprise the second field of the frame, while image 216 is one of the images in a subsequent field and was not recorded simultaneously therewith. Thus, the function of the switch 238 is now to connect P.M. 2 and 3, respectively, with lines 239 and 240 whereby all of the colorimetric signals appearing at the lines 239, 240 and 241 are reproductions of colorimetric information images recorded simultaneously on the film strip. Thus, no fringing will occur in this field of the frame.

The electronic switch 238 functions to accomplish the switching or reversal described above, and the specific circuitry of the switch will depend on the characteristics of the signals that are switched, the time allowed for switching, the allowable D.C. level shift, the required transient characteristics, and so on. Obviously, the switch must be triggered by the vertically driven pulleys from the television synchronizing generator, must operate completely while within the vertical blanking, must have good video band width, good D.C. stability, low amplitude, low switching transients, etc.

As has been brought out before, the $\bar{y}$, $\bar{z}$ and $\bar{x}$ signals appearing respectively on the lines 241, 239 and 240 are ordinary colorimetric signals that may be handled thereafter in a conventional manner and with conventional apparatus to provide video transmission signals for color television reception.

In Fig. 8, a black and white film 40 has recorded on it images corresponding to luminance and chrominance information as would be derived from the Fig. 4 apparatus. Each field ($f_1$, $f_2$, etc.) of film 40 represents images taken simultaneously. Each field ($f$) includes all of the luminance information ($y$) and a portion of the chrominance information ($x$ or $z$, as the case may be). To provide all of the information for a video frame, it is necessary to utilize the chrominance information from an adjacent field, so that all of the colorimetric information ($x$, $y$ and $z$) is available. Inasmuch as the fields ($f$) were recorded at different moments of time, the chrominance information taken from an adjacent field to complete the presentation of a particular frame conceivably might result in color fringing of the picture. This can be appreciated from the schematic presentation below film 40, in which field $f_2$ provides $y$ and $z$ information, but no $x$ information. The $x$ information is gained from $f_3$. Field $f_3$, being recorded 1/60 of a second later than field $f_2$, in the case of a moving image, would have the image positioned differently within the frame than it would be in the fields $y$ and $z$ of the field $f_2$.

Immediately below the film representation, the grouping of the fields for successive video fields is depicted. From this, it can be appreciated that one portion of the chrominance information ($x$, in the case of video fields A and C, and $z$ in the case of video field B) is derived from a film field ($f$) taken at a different moment of time than the remainder of the colorimetric information.

This is overcome in the procedure provided by the Fig. 6 apparatus, the film and field sequence being reproduced at the right side of Fig. 8. In the film 230 employed in conjunction with the Fig. 6 apparatus, each frame comprises four images—the frame thereby providing all of the colorimetric information needed to make up a video frame. The colorimetric information presented in each frame ($F_1$, $F_2$, $F_3$, etc.) includes fields $x$ and $z$ corresponding to chrominance information and two fields $y$, which are duplicates of each other and provide the luminance information. All four fields within a given frame F are taken simultaneously and the frames F occur at 1/30 of a second intervals.

In the reproduction of the colorimetric information from the fields F of film 230, only one luminance image $y$ is reproduced, but the three adjoining chrominance information images are reproduced. Of these three chrominance information images, the one image taken from the adjoining frame is discarded. For example, in making up video field A, parts of frame $F_1$ are scanned, along with the $x$ chrominance information from frame $F_2$. The chrominance information from frame $F_2$ is discarded in this case. To make up video field B, the film is advanced one registry opening and the lower $y$ field in frame $F_2$ is scanned, along with all of the chrominance information in frame $F_2$ and the $z$ information from frame $F_1$, this latter being discarded.

It is also to be noted that video field C will be identical with video field B, since both are derived from frame $F_2$. In this manner, the objectionable fringing or blurring is avoided.

While, in the foregoing specification, embodiments of the invention have been set out in considerable detail for purposes of illustration, it will be apparent to those skilled in the art that numerous changes may be made in those details without departing from the spirit and principles of the invention.

I claim:

1. A method of recording the luminance and chrominance portions of color video information, comprising the steps of recording a first colorimetric image on black and white film, the said first image providing the preponderance of the luminance information for a color television field, recording in the same film field containing said first image, and adjacent said first image, a second colorimetric image, the said second image providing a portion of the chrominance information for said color television field, and recording a second pair of colorimetric images in an adjacent film field, one of said second pair of images providing the remainder of the chrominance information for said color television field, the other of said second pair of images providing a preponderance of the luminance information for the next color television field.

2. The method of claim 1 in which the said first and second images are arranged for simultaneous scanning and in which the luminance images are identically positioned in each film field.

3. The method of reproducing color video information stored on black and white film having a pair of colorimetric images disposed in each film field and wherein the first colorimetric image in each film field provides the preponderance of the luminance information for a color television field and the second image in said film field provides a portion of the chrominance information for said color television field, the chrominance information image of an adjacent film field providing the remainder of the chrominance information for said color television field, the other information image in said adjacent film field providing a preponderance of the luminance information for the next color television field, comprising scanning the first and second images in a first film field and the chrominance image in an adjacent film field to provide a first color television field, and thereafter scanning the images in a second film field, said second film field being adjacent said first film field, and the chrominance image in a film field adjacent to said second film field to provide a second color television field, whereby, in producing a series of color television fields, each luminance image is scanned once and each chrominance image is scanned twice.

4. The method of claim 3 in which said film comprises a sequence of film frames, each film frame comprising two adjacent film fields, the four images present in each film frame being simultaneously recorded, said steps of scanning comprising scanning one luminance image and the adjacent three chrominance images, and discarding the signal from the one chrominance image not in the same frame as the luminance image scanned.

5. A method of recording color video information, comprising the steps of recording a first pair of colorimetric images on black and white film, the recorded images constituting one film field and being arranged for simultaneous scanning, one of said images providing substantially all of the luminance information for a color television field and the other image providing only a portion of the chrominance information for a color television field, recording a second pair of colorimetric images on said film in a film field position adjacent the said one film field, one of said second pair of images providing the remainder of the chrominance information for said color television field, and the other of said second pair of images providing substantially all of the luminance information for the next color television field, and recording a third pair of colorimetric images on said film in a film field position adjacent the film field containing said second pair of images and remote from the said one film field, one of said third pair of images being a luminance-providing image and the other of said third pair of images providing the same chrominance information as the chrominance-providing image in said first pair of images.

6. The method of claim 5 in which said color video information is reproduced subsequent to recordal, comprising scanning the images in said first film field and scanning the chrominance image in said second film field, and combining the signals from the three scanned images to provide a color television field.

(References on following page)

References Cited in the file of this patent

UNITED STATES PATENTS

| | | |
|---|---|---|
| 1,217,391 | Bennett | Feb. 27, 1917 |
| 1,421,279 | Manclaire | June 27, 1922 |
| 1,540,323 | Fox | June 2, 1925 |
| 1,857,578 | Wright | May 10, 1932 |
| 1,874,615 | Pilny | Aug. 30, 1932 |
| 1,897,752 | Chretien | Feb. 14, 1933 |
| 2,060,505 | Killman et al. | Nov. 10, 1936 |
| 2,152,224 | Thomas | Mar. 28, 1939 |
| 2,281,607 | Thomas | May 5, 1942 |
| 2,465,652 | Legler | Mar. 29, 1949 |
| 2,594,715 | Angel | Apr. 29, 1952 |
| 2,600,590 | Thomas | June 17, 1952 |
| 2,612,553 | Homrighous | Sept. 30, 1952 |
| 2,638,498 | De France | May 12, 1953 |
| 2,703,340 | Hoyt | Mar. 1, 1955 |
| 2,738,377 | Weighton | Mar. 13, 1956 |
| 2,786,386 | Hoyt | Mar. 26, 1957 |

FOREIGN PATENTS

| | | |
|---|---|---|
| 472,206 | Great Britain | Sept. 20, 1937 |
| 691,523 | Great Britain | May 13, 1953 |